US011324027B2

United States Patent
Yang

(10) Patent No.: US 11,324,027 B2
(45) Date of Patent: May 3, 2022

(54) METHOD, USER EQUIPMENT AND COMPUTER STORAGE MEDIUM FOR REPORTING BUFFER STATUS REPORT

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 28 days.

(21) Appl. No.: 16/861,734

(22) Filed: Apr. 29, 2020

(65) Prior Publication Data

US 2020/0260473 A1    Aug. 13, 2020

Related U.S. Application Data

(63) Continuation of application No. PCT/CN2017/108972, filed on Nov. 1, 2017.

(51) Int. Cl.
*H04W 72/12* (2009.01)

(52) U.S. Cl.
CPC ............... *H04W 72/1284* (2013.01)

(58) Field of Classification Search
CPC ......... H04W 72/1284; H04M 1/72519; H04M 1/72522
USPC ................. 370/328, 310.2; 455/550.1, 418
See application file for complete search history.

(56) References Cited

U.S. PATENT DOCUMENTS

| | | | | |
|---|---|---|---|---|
| 8,977,852 | B2* | 3/2015 | Naslund | H04L 63/12 |
| | | | | 713/168 |
| 2008/0095091 | A1* | 4/2008 | Surineni | H04W 52/0225 |
| | | | | 370/311 |
| 2009/0163211 | A1 | 6/2009 | Kitazoe et al. | |
| 2012/0113922 | A1* | 5/2012 | Kim | H04W 72/1284 |
| | | | | 370/329 |
| 2016/0007229 | A1* | 1/2016 | Gao | H04W 76/11 |
| | | | | 370/329 |
| 2018/0279321 | A1* | 9/2018 | Hori | H04W 72/10 |
| 2019/0090265 | A1* | 3/2019 | Zhang | H04L 5/0007 |
| 2020/0045577 | A1* | 2/2020 | Yu | H04W 72/1278 |

(Continued)

FOREIGN PATENT DOCUMENTS

| | | |
|---|---|---|
| CN | 104394598 A | 3/2015 |
| CN | 106105366 A | 11/2016 |

(Continued)

OTHER PUBLICATIONS

International Search Report (ISR) dated Jul. 23, 2018 for Application No. PCT/CN2017/108972.

(Continued)

*Primary Examiner* — Danh C Le
(74) *Attorney, Agent, or Firm* — Ladas & Parry LLP

(57) ABSTRACT

The disclosure discloses a method, a user equipment, and a computer storage medium for reporting a buffer status report, wherein the method includes: adding information related to an integrity-checking section to the buffer status report when a manner for reporting memory data is a first manner for reporting memory data; the first manner for reporting memory data is to report with data of the integrity-checking section counted; and sending the buffer status report to the network side.

20 Claims, 1 Drawing Sheet

(56) References Cited

U.S. PATENT DOCUMENTS

| | | | |
|---|---|---|---|
| 2020/0125218 A1* | 4/2020 | Bender | H04L 12/4641 |
| 2020/0229212 A1* | 7/2020 | You | H04W 72/1284 |
| 2021/0153222 A1* | 5/2021 | Yang | H04W 4/70 |

FOREIGN PATENT DOCUMENTS

| | | |
|---|---|---|
| CN | 106465125 A | 2/2017 |
| CN | 104954978 A | 9/2019 |
| WO | 2015070444 A1 | 5/2015 |

OTHER PUBLICATIONS

The EESR of corresponding European application No. 17930195.7. dated Sep. 23, 2020.
3GPP TS 36.321 V14.3.0 (Jun. 2017); 3rd Generation Partnership Project;Technical Specification Group Radio Access Network:Evolved Universal Terrestrial Radio Access (E-UTRA);Medium Access Control (MAC) protocol specification (Release 14).
3GPP TS 36.323 V14.3.0 (Jun. 2017); 3rd Generation Partnership Project;Technical Specification Group Radio Access Network:Evolved Universal Terrestrial Radio Access (E-UTRA);Packet Data Convergence Protocol (PDCP) specification(Release 14).
Huawei et al.:"Integrity protection and Counter Check Procedure for NR UP", 3GPP Draft: R2-1709614 Integrity Protection and Counter Check Procedure for NR V01, 3rd Generation Partnership Project (3GPP), Mobile Competence Centre; 650, Route Des Lucioles; F-06921 Sophia-Antip, vol. RAN WG2, No. Berlin, Germany; Aug. 21, 2017-Aug. 25, 2017 Aug. 20, 2017(Aug. 20, 2017). XP051319329.
LG Electronics Inc:"Flexible long BSR", 3GPP Draft; R2-1711723 Flexible BSR, 3rd Generation Partnership Project (3GPP), Mobile Competence Centre; 650, Route Des Lucioles; F-06921 Sophia-Antipolis Cedex: France, vol. RAN WG2, No. Prague, Czech Republic; Oct. 9, 2017-Oct. 13, 2017 Oct. 8, 2017(Oct. 8, 2017). XP051343661.
Ericsson:"Aspects of BSR format and tables", 3GPP Draft; R2-1711181- Aspects of BSR Format and Tables. 3rd Generation Partnership Project (3GPP), Mobile Competence Centre; 650. Route Des Lucioles; F-06921 Sophia-Antipolis Cedex; France, vol. RAN WG2, No. Prague, Czech Republic; Oct. 9, 2017-Oct. 13, 2017 Oct. 8, 2017(Oct. 8, 2017), XP051343189.
Ericsson:"RAN assisted codec rate selection and adaptation", 3GPP Draft; R2-167082-RAN Assisted Codec Rate Selection and Adaptation, 3rd Generation Partnership Project (3GPP), Mobile Competence Centre; 650, Route Des Lucioles: F-06921 Sophia-Antipolis Cedex; France, vol. RAN WG2, No. Kaohsiung, Taiwan; Oct. 10, 2016-Oct. 14, 2016 Oct. 9, 2016(Oct. 9, 2016). XP051151484.
Ericsson:"MAC-I field for DRBs", 3GPP Draft; R2-1708326-MAC-I for DRBs, 3rd Generation Partnership Project (3GPP), Mobile Competence Centre; 660, Route Des Lucioles; F-06921 Sophia-Antipolis Cedex; France. vol RAN WG2, No. Bertin, Germany; Aug. 21, 2017-Aug. 25, 2017 Aug. 20, 2017(Aug. 20, 2017) XP051318209.
Intel Corporation:"BSR enhancements", 3GPP Draft; R2-1710606 BSR, 3rd Generation Partnership Project (3GPP), Mobile Competence Centre; 650, Route Des Lucioles; F-06921 Sophia-Antipolis Cedex; France, vol. RAN WG2, No. Prague. Czech Republic: Oct. 9, 2017-Oct. 13, 2017 Sep. 29, 2017(Sep. 29, 2017). XP051355034.
Huawei et al:"Design of BSR format and BS table," 3GPP Draft; R2-17102020 BSR Format and BS Table Design, 3rd Generation Partnership Project (3GPP), Mobile Competence Centre: 650, Route Des Lucioles; F-06921 Sophia-Antipolis Cedex; France. vol. RAN WG2, No. Prague, Czech Republic; Oct. 9, 2017-Oct. 13, 2017 Sep. 29, 2017(Sep. 29, 2017). XP051354772.
US 2009/163211 A1 (Kitazoe Masato [JP] et al) Jun. 25, 2009 (Jun. 25, 2009) * paragraph [0007]—paragraph [0011] * * paragraph [0047] * paragraph [0069] * * paragraph [0072]—paragraph [0095]; figures 8C, 8D, 9, 10, 11, 12, 13 *, 1-15, Inv. H04L1/18 H04W12/10 H04W74/00.

Huawei et al: "Integrity protection and Counter Check Procedure for NR UP", 3GPP Draft; R2-1709614 Integrity Protection and Counter Check Procedure for NR V01, 3rd Generation Partnership Project (3GPP), Mobile Competence Centre ; 650, Route Des Lucioles ; F-06921 Sophia-Antip, vol. RAN WG2, No. Berlin, Germany Aug. 21, 2017-Aug. 25, 2017 Aug. 20, 2017 (Aug. 20, 2017), XP051319329, Retrieved from the Internet: URL:http://www.3gpp.org/ftp/Meetings_3GPP_SYNC/RAN2/Docs/ [retrieved on Aug. 20, 2017] * the whole document * H04L H04W.
LG Electronics Inc: "Flexible long BSR", 3GPP Draft; R2-1711723 Flexible BSR, 3rd Generation Partnership Project (3GPP), Mobile Competence Centre ; 650, Route Des Lucioles ; F-06921 Sophia-Antipolis Cedex ; France, vol. RAN WG2, No. Prague, Czech Republic Oct. 9, 2017- Oct. 13, 2017 Oct. 8, 2017 (Oct. 8, 2017), XP051343681, Retrieved from the Internet: URL:http://www.3gpp.org/ftp/Meetings_3GPP_SYNC/RAN2/Docs/ [retrieved on Oct. 8, 2017] * the whole document *, 1-15.
Ericsson: "Aspects of BSR format and tables", 3GPP Draft; R2-1711181—Aspects of BSR Format and Tables, 3rd Generation Partnership Project (3GPP) , Mobile Competence Centre ; 650, Route Des Lucioles ; F-06921 Sophia-Antipolis Cedex ; France, vol. RAN WG2, No. Prague, Czech Republic; Oct. 9, 2017-Oct. 13, 2017 Oct. 8, 2017 (Oct. 8, 2017), XP051343189, Retrieved from the Internet: URL:http://www.3gpp.org/ftp/Meetings_3GPP_SYNC/RAN2/Docs/ [retrieved on Oct. 8, 2017] * the whole document *.
Ericsson: "RAN assisted codec rate selection and adaptation", 3GPP Draft; R2-167082—RAN Assisted Codec Rate Selection and Adaptation, 3rd Generation Partnership Project (3GPP) , Mobile Competence Centre ; 650, Route Des Lucioles ; F-06921 Sophia-Antipolis Cedex, vol. RAN WG2, No. Kaohsiung, Taiwan; Oct. 10, 2016-Oct. 14, 2016 Oct. 9, 2016 (Oct. 9, 2016), XP051151484, Retrieved from the Internet: URL:http://www.3gpp.org/ftp/Meetings_3GPP_SYNC/RAN2/Docs/ [retrieved on Oct. 9, 2016] * the whole document *, 1-15.
Ericsson: "MAC-I field for DRBs", 3GPP Draft; R2-1708326—MAC-I for DRBS, 3rd Generation Partnership Project (3GPP) , Mobile Competence Centre ; 650, Route Des Lucioles ; F-06921 Sophia-Antipolis Cedex; France, vol. RAN WG2, No. Berlin, Germany Aug. 21, 2017-Aug. 25, 2017 Aug. 20, 2017 (Aug. 20, 2017), XP051318209, Retrieved from the Internet: URL:http://ww.3gpp.org/ftp/Meetings_3GPP_SYNC/RAN2/Docs/ [retrieved on Aug. 20, 2017] * the whole document *, 1-15.
Intel Corporation: "BSR enhancements", 3GPP Draft; R2-1710606 BSR, 3rd Generation Partnership Project (3GPP) , Mobile Competence Centre ; 650, Route Des Lucioles ; F-06921 Sophia-Antipolis Cedex; France, vol. RAN WG2, No. Prague, Czech Republic Oct. 9, 2017-Oct. 13, 2017 Sep. 29, 2017 (Sep. 29, 2017), XP051355034, Retrieved from the Internet: URL:http://www.3gpp.org/ftp/tsg_ran/WG2_RL2/TSGR2_99bis/Docs/ [retrieved on Sep. 29, 2017] * the whole document *, 1-15.
Huawei et al: "Design of BSR format and BS table", 3GPP Draft; R2-1710202 BSR Format and BS Table Design, 3rd Generation Partnership Project (3GPP), Mobile Competence Centre ; 650, Route Des Lucioles ; F-06921 Sophia-Antipolis Cedex ; France, vol. RAN WG2, No. Prague, Czech Republic; Oct. 9, 2017-Oct. 13, 2017 Sep. 29, 2017 (Sep. 29, 2017), XP051354772, Retrieved from the Internet: URL:http://www.3gpp.org/ftp/tsg_ran/WG2_RL2/TSGR2_99bis/Docs/ [retrieved on Sep. 29, 2017] * the whole document *, 1-15.
Huawei et al: "Integrity protection and Counter Check Procedure for NR UP", 3GPP DRAFT; R2-1709614 Integrity Protection and Counter Check Procedure For NR V01, 3rd Generation Partnership Project (3GPP), Mobile Competence Centre ; 650, Route Des Lucioles ; F-06921 Sophia-Antip, vol. RAN WG2, No. Berlin, Germany; Aug. 21, 2017-Aug. 25, 2017 Aug. 20, 2017 (Aug. 20, 2017), XP051319329, Retrieved from the Internet: URL:http://www.3gpp.org/ftp/Meetings_3GPP_SYNC/RAN2/Docs/ [retrieved on Aug. 20, 2017].
LG Electronics Inc: "Flexible long BSR", 3GPP DRAFT; R2-1711723 Flexible BSR, 3rd Generation Partnership Project (3GPP), Mobile Competence Centre ; 650, Route Des Lucioles ; F-06921 Sophia-Antipolis Cedex ; France, vol. RAN WG2, No. Prague, Czech Republic; Oct. 9, 2017-Oct. 13, 2017 Oct. 8, 2017 (Oct. 8, 2017),

(56) References Cited

OTHER PUBLICATIONS

XP051343681, Retrieved from the Internet: URL:http://www.3gpp.org/ftp/Meetings_3GPP_SYNC/RAN2/Docs/ [retrieved on Oct. 8, 2017].

Ericsson: "Aspects of BSR format and tables", 3GPP DRAFT R2-1711181—Aspects of BSR Format and Tables, 3rd Generation Partnership Project (3GPP), Mobile Competence Centre ; 650, Route Des Lucioles ; F-06921 Sophia-Antipolis Cedex ; France, vol. RAN WG2, No. Prague, Czech Republic; Oct. 9, 2017-Oct. 13, 2017 Oct. 8, 2017 (Oct. 8, 2017), XP051343189, Retrieved from the Internet: URL:http://www.3gpp.org/ftp/Meetings_3GPP_SYNC/RAN2/Docs/ [retrieved on Oct. 8, 2017].

Ericsson: "RAN assisted codec rate selection and adaptation", 3GPP Draft; R2-167082—RAN Assisted Codec Rate Selection and Adaptation, 3rd Generation Partnership Project (3GPP), Mobile Competence Centre ; 650, Route Des Lucioles ; F-06921 Sophia-Antipolis Cedex, vol. RAN WG2, No. Kaohsiung, Taiwan; Oct. 10, 2016-Oct. 14, 2016 Oct. 9, 2016 (Oct. 9, 2016), XP051151484, Retrieved from the Internet: URL:http://www.3gpp.org/ftp/Meetings_3GPP_SYNC/RAN2/Docs/ [retrieved on Oct. 9, 2016].

Ericsson: "MAC-I field for DRBs", 3GPP DRAFT; R2-1708326—MAC-I for DRBS, 3rd Generation Partnership Project (3GPP), Mobile Competence Centre ; 650, Route Des Lucioles ; F-06921 Sophia-Antipolis Cedex ; France, vol. RAN WG2, No. Berlin, Germany; Aug. 21, 2017-Aug. 25, 2017 Aug. 20, 2017 (Aug. 20, 2017), XP051318209, Retrieved from the Internet: URL:http://www.3gpp.org/ftp/Meetings_3GPP_SYNC/RAN2/Docs/ [retrieved on Aug. 20, 2017].

Intel Corporation: "BSR enhancements", 3GPP DRAFT; R2-1710606 BSR, 3rd Generation Partnership Project (3GPP), Mobile Competence Centre ; 650, Route Des Lucioles ; F-06921 Sophia-Antipolis Cedex ; France, vol. RAN WG2, No. Prague, Czech Republic; Oct. 9, 2017-Oct. 13, 2017 Sep. 29, 2017 (Sep. 29, 2017), XP051355034, Retrieved from the Internet: URL:http://www.3gpp.org/ftp/tsg_ran/WG2_RL2/TSGR2_99bis/Docs/ [retrieved on Sep. 29, 2017].

Huawei et al: "Design of BSR format and BS table", 3GPP DRAFT; R2-1710202 BSR Format and BS Table Design, 3rd Generation Partnership Project (3GPP), Mobile Competence Centre ; 650, Route Des Lucioles ; F-06921 Sophia-Antipolis Cedex ; France, vol. RAN WG2, No. Prague, Czech Republic; Oct. 9, 2017-Oct. 13, 2017 Sep. 29, 2017 (Sep. 29, 2017), XP051354772, Retrieved from the Internet: URL:http://www.3gpp.org/ftp/tsg_ran/WG2_RL2/TSGR2_99bis/Docs/ [retrieved on Sep. 29, 2017].

The first Office Action of corresponding Indian application No. 202017021947, dated Apr. 22, 2021.

\* cited by examiner

METHOD, USER EQUIPMENT AND COMPUTER STORAGE MEDIUM FOR REPORTING BUFFER STATUS REPORT

CROSS-REFERENCE TO RELATED APPLICATION

This application is a continuation of International Application No. PCT/CN2017/108972, filed on Nov. 1, 2017, the disclosure of which is hereby incorporated by reference in its entirety.

TECHNICAL FIELD

The present disclosure relates to the field of communication technologies and, in particular, to a method, a user equipment (UE) and a storage medium for reporting a buffer status report.

BACKGROUND

Currently, with the pursuit of speed, delay, high-speed mobility, energy efficiency from human beings, and with the diversity and complexity of services in the future, the 3GPP International Standards Organization has started to develop 5G. In 5G, a UE sends a report about an amount of data to be sent in its memory to a network side through a buffer status report (BSR), which is convenient for a base station to schedule and allocate resources reasonably for the UE. A requirement for an integrity protection of data resource bearer (DRB) does not exist in LTE, but is added in NR. For this purpose, each packet data convergence protocol service data unit (PDCP SDU) may carry an additional MAC-I section for the integrity protection check. This increases an additional air interface data load, therefore, in accordance with a calculation method of memory data in the BSR reported previously, an increase in the air interface data brought by the MAC-I is not considered, which does not reflected the amount of data to be sent by the UE correctly to some extent.

SUMMARY

To solve the above technical problems, embodiments of the present disclosure provide a method, a user equipment and a computer storage medium for reporting a buffer status report.

An embodiment of the present disclosure provides a method for reporting a buffer status report, which is applied to a user equipment (UE), including:

adding information related to an integrity-checking section into the buffer status report when a manner for reporting memory data is a first manner for reporting memory data; the first manner for reporting memory data is to report with data of the integrity-checking section counted; and sending the buffer status report to a network side.

In the above scheme, the method further includes:

reporting a UE capability to the network side, where the UE capability at least includes whether to support the first manner for reporting memory data.

In the above scheme, the method further includes:

acquiring the manner for reporting memory data indicated for the UE from the network side; and where, the manner for reporting memory data includes the first manner for reporting memory data and a second manner for reporting memory data; the second manner for reporting memory data is different from the first manner for reporting memory data, and the second manner for reporting memory data is to report without the data of the integrity-checking section counted as required counted as required.

In the above scheme, the adding information related to an integrity-checking section into the buffer status report, includes:

counting the data of the integrity-checking section, and adding a quantity of the data of the integrity-checking section counted into the buffer status report.

In the above scheme, the adding information related to an integrity-checking section into the buffer status report, includes:

counting the data of the integrity-checking section, and obtaining a floating amount percentage between a quantity of the data of the integrity-checking section and a quantity of current data contained in a current buffer status report; and the buffer status report includes the quantity of the current data and the floating amount percentage.

In the above scheme, the method further includes:

determining that the UE adopts the second manner for reporting memory data when not to group according to a priority of logical channels; the second manner for reporting memory data is different from the first manner for reporting memory data, and the second manner for reporting memory data is to report without the data of the integrity-checking section counted as required counted as required.

In the above scheme, the method further includes:

determining not to group according to the priority of logical channels, when logical channels corresponding to a data resource bearer (DRB) that are configured with a DRB integrity protection function are configured in a same logical channel group (LCG).

An embodiment of the present disclosure further provides a UE, including:

a processing unit, configured to add information related to an integrity-checking section into a buffer status report, when a manner for reporting memory data is a first manner for reporting memory data; the first manner for reporting memory data is to report with the data of the integrity-checking section counted; and a communicating unit, configured to send the buffer status report to a network side.

In the above scheme, the processing unit reports a UE capability to the network side through the communicating unit, where the UE capability at least includes whether to support the first manner for reporting memory data.

In the above scheme, the processing unit, obtains the manner for reporting memory data indicated for the UE from the network side;

where, the manner for reporting memory data includes the first manner for reporting memory data and a second manner for reporting memory data; the second manner for reporting memory data is different from the first manner for reporting memory data, and the second manner for reporting memory data is to report without the data of the integrity-checking section counted as required.

In the above scheme, the processing unit, counts the data of the integrity-checking section and add a quantity of the data of the integrity-checking section counted into the buffer status report.

In the above scheme, the processing unit, counts the data of the integrity-checking section, and obtains a floating amount percentage between a quantity of the data of the integrity-checking section and a quantity of current data contained in a current buffer status report, and the buffer status report includes the quantity of the current data and the floating amount percentage.

In the above scheme, the processing unit, determines that the UE adopts a second manner for reporting memory data when not to group according to a logical channel priority; the second manner for reporting memory data is different from the first manner for reporting memory data, and the second manner for reporting memory data reports without the data of the integrity-checking section counted as required.

In the above scheme, the processing unit, determines not to group according to the priority of logical channels, when logical channels corresponding to a data resource bearer (DRB) that is configured with a DRB integrity protection function are configured in a same logical channel group LCG.

An embodiment of the present disclosure provides a UE, including: a processor and a memory for storing a computer program that can be executed on the processor, where, the processor is configured to execute the computer program to perform the above method steps.

An embodiment of the present disclosure provides a computer storage medium, the computer storage medium stores computer executable instructions, and the computer executable instruction, when executed, implements the above method steps.

In the technical scheme of the embodiments of the disclosure, information related to an integrity-checking section is added into the buffer status report when a manner for reporting memory data is determined as a first manner for reporting memory data, thereby an impact of data of the integrity-checking section is considered in a reporting process of the buffer status report, so as to ensure that the network side can actually obtain the quality of data to be sent from the UE side. In this way, it is conducive for the network side to schedule data correctly.

BRIEF DESCRIPTION OF DRAWING(S)

DESCRIPTION OF EMBODIMENTS

In order to understand features and technical contents of embodiments of the present disclosure in more detail, implementations of the embodiments of the present disclosure will be described in detail below with reference to the accompany drawings. The accompany drawings are used for reference only rather than to limit the embodiments of the disclosure.

Embodiment 1

Figure 1:
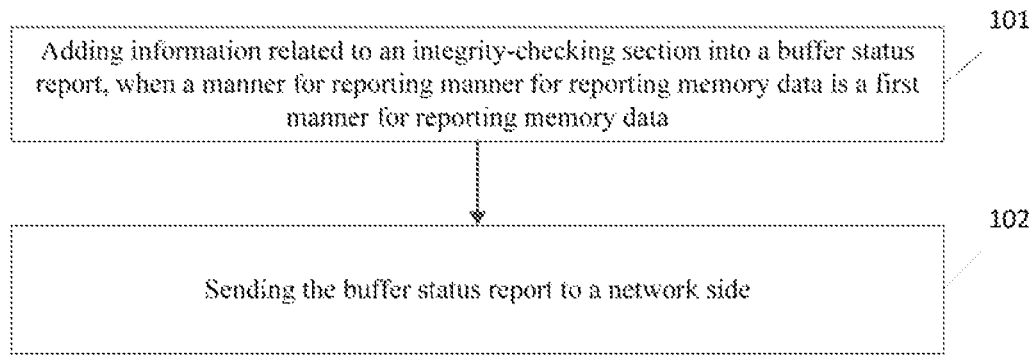
FIG. 1 is a flowchart of a method for reporting a buffer status report provided by an embodiment of the present disclosure.

An embodiment of the disclosure provides a method for reporting a buffer status report, which is applied to a user equipment (UE), as shown in FIG. 1, including:

step 101: adding information related to an integrity-checking section into the buffer status report, when a manner for reporting memory data is a first manner for reporting memory data; the first manner for reporting memory data is to report with data of the integrity-checking section counted; and step 102: sending the buffer status report to a network side.

Herein, the user equipment in this embodiment may be a device such as a smart phone, a tablet computer and the like (not intended to be exhaustive herein) that can access to a mobile communication network.

It should be understood that, before executing the step 101, the UE may further determine whether to adopt the first manner for reporting memory data to report the memory data; and regarding how to determine the manner for reporting memory data of the UE, it may include:

acquiring the manner for reporting memory data indicated for the UE from the network side; and where, the manner for reporting memory data includes the first manner for reporting memory data and a second manner for reporting memory data; the second manner for reporting memory data is different from the first manner for reporting memory data, and the second manner for reporting memory data is to report without the data of the integrity-checking section counted as required.

It should also be noted that, the network side may refer to capability information of the UE reported by the UE when indicating a corresponding manner for reporting memory data for the UE, and of course, the network side may refer to an actual situation when configuring and indicating for the UE side.

On the basis of the present method, the method further includes:

reporting a UE capability to the network side, where the UE capability at least includes whether to support the first manner for reporting memory data.

That is to say, the UE may know that whether it supports the first manner for reporting memory data or not. If the UE supports, it may be sent to the network side in the UE capability. Correspondingly, the network side indicates the manner for reporting memory data for the UE according to the UE capability.

Specifically, when calculating the memory data, data of the integrity-checking section (such as the data of MAC-I section) brought by considering data integrity protection, is included into statistics of the memory data. Whether the capability reported by the UE supports this type for reporting of memory statistical, the network side configures for the UE to adopt which manner for reporting memory according to the capability of the UE: reporting the memory data statistical with the MAC-I counted, or reporting the memory data statistical without the MAC-I not considered.

Another manner is to determine whether to adopt the first manner for reporting memory data according to a manner of whether to group according to a priority of logical channel. Specifically, the method further includes:

determining that the UE adopts a second manner for reporting memory data when not to group according to the priority of logical channels; the second manner for reporting memory data is different from the first manner for reporting memory data, and the second manner for reporting memory data is to report without the data of the integrity-checking section counted as required.

Specifically, when logical channels corresponding to a data resource bearer (DRB) that is configured with a DRB integrity protection (IP) function are configured in a logical channel group (LCG), it is determined not to group according to the priority of logical channels.

For example, the logical channels corresponding to the DRB that is configured with the DRB integrity protection function are configured in an LCG. It does not group according to the priority of logical channels. When the UE calculates the memory data, PDCP SDU is considered while the MAC-I section is not considered.

Finally, it should be noted that, there may be various manners for adding information related to the integrity-checking section into the buffer status report as aforementioned, such as:

Manner 1: counting the data of the integrity-checking section, and adding a quantity of the data of the integrity-checking section into the buffer status report.

In this manner, in addition to a current data quantity, the buffer status report may also include the quantity of the data of the integrity-checking section (the quantity of the data of the MAC-I section).

Manner 2:

counting the data of the integrity-checking section, and obtains a floating amount percentage between a quantity of the data of the integrity-checking section and a quantity of current data contained in a current buffer status report; and the buffer report includes the quantity of the current data and the floating amount percentage.

In other words, in the BSR reporting (after indicating counting the MAC-I), actual data to be transmitted is the floating amount percentage of the BSR reported currently. A base station obtains the quantity of the data to be transmitted actually according to the BSR actually reported and a floating percentage for the MAC-I. Then the data may be scheduled correctly.

It can be seen that, by adopting the above scheme, the information related to the integrity-checking section may be added into the buffer status report, when the manner for reporting memory data is determined as the first manner for reporting memory data; therefore the impact of the data of the integrity-checking section is considered in the reporting process of the buffer status report, so as to ensure that the network side can actually obtain the quantity of the data to be transmitted on the UE side. In this way, it is conducive to schedule the data correctly on the network side.

Embodiment 2

Figure 2:
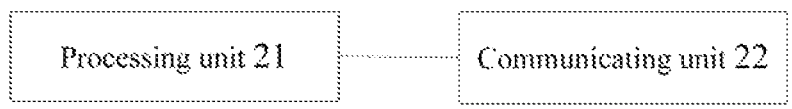
FIG. 2 is a structure diagram of a user equipment provided by an embodiment of the present disclosure.

An embodiment of the present disclosure provides a user equipment (UE), as shown in FIG. 2, including:

a processing unit 21, configured to add information related to an integrity-checking section into the buffer status report when a manner for reporting memory data is a first manner for reporting memory data; the first manner for reporting memory data is to report with data of the integrity-checking section counted; and a communicating unit 22, configured to send the buffer status report to a network side.

Herein, the user equipment in the present embodiment may a device such as a smart phone, a tablet computer and the like (not intended to be exhaustive herein) that can access to a mobile communication network.

It should be understood that, regarding how to determine the manner for reporting memory data of the UE, it may include:

the processing unit 21, obtains the manner for reporting memory data indicated for the UE from the network side;

where, the manner for reporting memory data includes the first manner for reporting memory data and a second manner for reporting memory data; the second manner for reporting memory data is different from the first manner for reporting memory data, and the second manner for reporting memory data is to report without the data of the integrity-checking section counted as required.

It should also be noted that, the network side may refer to capability information of the UE reported by the UE when indicating a corresponding manner for reporting memory data for the UE, and of course, the network side may refer to an actual situation when configuring and indicating for the UE side.

On the basis of the present manner, the processing unit 21 reports a UE capability to the network side through the communicating unit 22, where the UE capability at least includes whether to support the first manner for reporting memory data or not.

That is to say, the UE may know whether it supports the first manner for reporting memory data. If the UE supports, it can be sent to the network side in the UE capability. Correspondingly, the network side indicates the manner for reporting memory data for the UE according to the UE capability.

Specifically, when calculating the memory data, data of the integrity-checking section (such as the data of MAC-I section) brought by considering data integrity protection, is included into statistics of the memory data. Whether the capability reported by the UE supports this type for reporting of memory statistical, the network side configures for the UE to adopt which manner for reporting memory according to the capability of the UE: reporting the memory data statistical with the MAC-I counted, or reporting the memory data statistical without the MAC-I not considered.

Another manner is to determine whether to adopt the first manner for reporting memory data according to a manner of whether to group according to a priority of logical channel. Specifically, the processing unit 21 determines that the UE adopts a second manner for reporting memory data when not to group according to the priority of logical channels; the second manner for reporting memory data is different from the first manner for reporting memory data, and the second manner for reporting memory data is to report without the data of the integrity-checking section counted as required.

Specifically, the logical channels corresponding to the DRB that is configured with the DRB integrity protection function are configured in an LCG. It does not group according to the priority of logical channels. When the UE calculates the memory data, PDCP SDU is considered while the MAC-I section is not considered.

For example, the logical channel corresponding to the DRB that configured with the DRB integrity protection function is configured in an LCG. The priority of logical channels is not referred to group. When the UE calculates the memory data, PDCP SDU is considered while the MAC-I section is not considered.

Finally, it should be noted that, there may be various manners for adding information related to the integrity-checking section into the buffer status report as aforementioned, such as:

Manner 1: the processing unit 21 counts the data of the integrity-checking section, and adding a quantity of the data of the integrity-checking section into the buffer status report.

In this manner, in addition to a current data quantity, the buffer status report may also include the quantity of the data of the integrity-checking section (the quantity of the data of the MAC-I section).

Manner 2:

the processing unit 21 counts the data of the integrity-checking section, and obtains a floating amount percentage between a quantity of the data of the integrity-checking section and a quantity of current data contained in a current buffer status report;

the buffer status report includes the quantity of the current data and the floating amount percentage.

In other words, in the BSR reporting (after indicating counting the MAC-I), actual data to be transmitted is the floating amount percentage of the BSR reported currently. A base station obtains the quantity of the data to be transmitted actually according to the BSR actually reported and a floating percentage for the MAC-I. Then the data may be scheduled correctly.

It can be seen that, by adopting the above scheme, the information related to the integrity-checking section may be added into the buffer status report, when the manner for reporting memory data is determined as the first manner for reporting memory data; therefore the impact of the data of the integrity-checking section is considered in the reporting process of the buffer status report, so as to ensure that the network side can actually obtain the quantity of the data to be transmitted on the UE side. In this way, it is conducive to schedule the data correctly on the network side.

Figure 3:
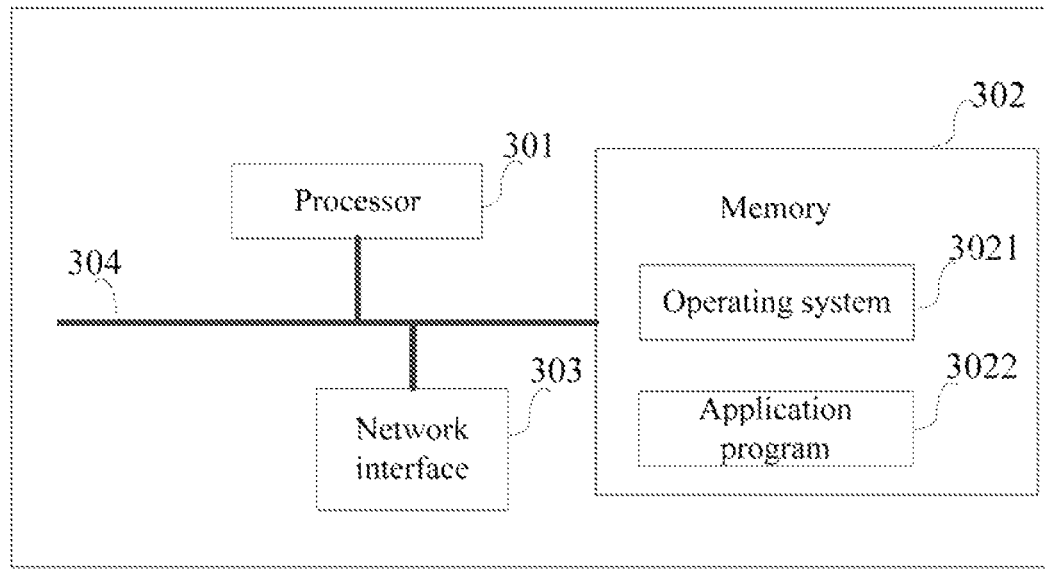
FIG. 3 is a hardware architecture diagram according to an embodiment of the present disclosure.

An embodiment of the present disclosure also provides a hardware composition architecture of a UE, as shown in FIG. 3, including: at least one processor 301, a memory 302 and at least one network interface 303, and respective components thereof are coupled via a bus system 304. It may be understood that, the bus system 304 is used to implement connection communications between these components. In addition to a data bus, the bus system 304 also includes a power bus, a control bus and a status signal bus. However, for the sake of clarity, all kinds of buses are labeled as the bus system 304 in FIG. 3.

It may be understood that the memory 302 in the embodiment of the present disclosure may be a volatile memory or a non-volatile memory, or both of them.

In some corresponding methods, the memory 302 stores the following elements, an executable module or a data structure or their subsets, or their extension sets:

an operating system 3021 and an application program 3022.

Where, the processor 301 is configured to be able to perform all the method steps described above in the "Embodiment 1", which will not be repeated herein.

An embodiment of the present disclosure provides a computer storage medium which stores computer executable instructions. The computer executable instructions, when executed, may implement the method steps described above in the "Embodiment 1" or "Embodiment 2" which will not be repeated herein.

The device described above in the embodiment of the disclosure can also be stored in a computer readable storage medium, when it is realized in a form of a software function module and sold or used as an independent product. Based on such understanding, the technical solution of the embodiments of the present disclosure substantially, or the part thereof that make contributions to the prior art, may be embodied in a form of software products. And the computer software product is stored in a storage medium, includes several instructions to enable a computer device (which may be a personal computer, a server, a network device, and etc.) to execute parts or all of the methods of respective embodiments of the present disclosure. The storage medium mentioned above may include: a U disk, a mobile hard disk, a read only memory (ROM), a disk or an optical disk and other medium that can store program code. In this way, the embodiments of the present disclosure are not limited to any specific combination of hardware and software.

Accordingly, the embodiment of the present disclosure also provides a computer storage medium, with a computer program stored thereon, and the computer program is configured to execute the method for reporting a buffer status report according to the embodiments of the present disclosure.

Although preferred embodiments of the present disclosure have been disclosed for exemplary purposes, those skilled in the art will be aware that various improvements, additions and substitutions are also possible, and therefore, the scope of the disclosure should not be limited to the above embodiments.

What is claimed is:

1. A method for reporting a buffer status report, which is applied to a user equipment (UE), comprising:
    adding information related to an integrity-checking section to the buffer status report when a manner for reporting memory data is a first manner for reporting memory data; the first manner for reporting memory data being to report with data of an integrity-checking section counted; and
    sending the buffer status report to a network side.

2. The method according to claim 1, further comprising:
    reporting a UE capability to the network side, wherein the UE capability at least comprises whether to support the first manner for reporting memory data.

3. The method according claim 1, further comprising:
    acquiring the manner for reporting memory data indicated for the UE from the network side; and
    wherein the manner for reporting memory data comprises the first manner for reporting memory data and a second manner for reporting memory data; and the second manner for reporting memory data is different from the first manner for reporting memory data, the second manner for reporting memory data being to report without the data of the integrity-checking section counted as required counted as required.

4. The method according to claim 1, wherein the adding information related to an integrity-checking section to the buffer status report, comprises:
    counting the data of the integrity-checking section, and adding a quantity of the data of the integrity-checking section counted to the buffer status report.

5. The method according to claim 1, wherein the adding information related to an integrity-checking section to the buffer status report, comprises:
    counting the data of integrity-checking section, and obtaining a floating amount percentage between a quantity of the data of the integrity-checking section and a quantity of current data contained in a current buffer status report; and
    including the quantity of the current data and the floating amount percentage into the buffer report.

6. The method according to claim 1, further comprising:
    determining that the UE adopts a second manner for reporting memory data when not to group according to a priority of logical channels; the second manner for reporting memory data being different from the first manner for reporting memory data, and the second manner for reporting memory data being to report without the data of the integrity-checking section counted as required counted as required.

7. The method according to claim 6, further comprising:
determining not to group according to the priority of logical channels, when logical channels corresponding to a data resource bearer (DRB) that is configured with a DRB integrity protection function are configured in a same logical channel group (LCG).

8. A user equipment (UE), comprising: a processor, a memory for storing a computer program that can be executed on the processor and at least one network interface,
wherein the processor is configured to add information related to an integrity-checking section to a buffer status report, when a manner for reporting memory data is a first manner for reporting memory data; the first manner for reporting memory data is to report with data of the integrity-checking section counted; and
the at least one network interface is configured to send the buffer status report to a network side.

9. The UE according to claim 8, wherein the at least one network interface is further configured to report a UE capability to the network side through the communicating unit, wherein the UE capability at least comprises whether to support the first manner for reporting memory data.

10. The UE according to claim 8, wherein the processor is further configured to obtain the manner for reporting memory data indicated for the UE from the network side; and
wherein the manner for reporting memory data comprises the first manner for reporting memory data and a second manner for reporting memory data; the second manner for reporting memory data is different from the first manner for reporting memory data, and the second manner for reporting memory data is to report without the data of the integrity-checking section counted as required counted as required.

11. The UE according to claim 8, wherein the processor is further configured to count the data of the integrity-checking section and add a quantity of the data of the counted integrity-checking section to the buffer status report.

12. The UE according to claim 8, wherein the processor is further configured to count the data of the integrity-checking section, and obtain a floating amount percentage between a quantity of the data of the integrity-checking section and a quantity of current data contained in a current buffer status report, and to include the quantity of the current data and the floating amount percentage into the buffer status report.

13. The UE according to claim 8, wherein the processor is further configured to determine that the UE adopts a second manner for reporting memory data, when not to group according to a priority of logical channels; the second manner for reporting memory data is different from the first manner for reporting memory data, and the second manner for reporting memory data is to report without the data of the integrity-checking section counted as required counted as required.

14. The UE according to claim 13, wherein the processor is further configured to determine not to group according to the priority of logical channels, when logical channels corresponding to a data resource bearer (DRB) that is configured with a DRB integrity protection function are configured in a same logical channel group (LCG).

15. A non-transitory computer storage medium, wherein the computer storage medium stores computer executable instructions, and the computer executable instructions, when executed, are configured to:
add information related to an integrity-checking section to the buffer status report when a manner for reporting memory data is a first manner for reporting memory data; the first manner for reporting memory data being to report with data of an integrity-checking section counted; and
send the buffer status report to a network side.

16. The non-transitory computer storage medium according to claim 15, wherein the computer executable instructions, when executed, are further configured to:
report a UE capability to the network side, wherein the UE capability at least comprises whether to support the first manner for reporting memory data.

17. The non-transitory computer storage medium according to claim 15, wherein the computer executable instructions, when executed, are further configured to:
acquire the manner for reporting memory data indicated for the UE from the network side; and
wherein the manner for reporting memory data comprises the first manner for reporting memory data and a second manner for reporting memory data; and the second manner for reporting memory data is different from the first manner for reporting memory data, the second manner for reporting memory data being to report without the data of the integrity-checking section counted as required counted as required.

18. The non-transitory computer storage medium according to claim 15, wherein the computer executable instructions, when executed, are configured to:
count the data of the integrity-checking section, and adding a quantity of the data of the integrity-checking section counted to the buffer status report.

19. The non-transitory computer storage medium according to claim 15, wherein the computer executable instructions, when executed, are configured to:
count the data of integrity-checking section, and obtaining a floating amount percentage between a quantity of the data of the integrity-checking section and a quantity of current data contained in a current buffer status report; and
include the quantity of the current data and the floating amount percentage into the buffer report.

20. The non-transitory computer storage medium according to claim 15, wherein the computer executable instructions, when executed, are further configured to:
determine that the UE adopts a second manner for reporting memory data when not to group according to a priority of logical channels; the second manner for reporting memory data being different from the first manner for reporting memory data, and the second manner for reporting memory data being to report without the data of the integrity-checking section counted as required counted as required.

* * * * *